United States Patent Office
3,508,687
Patented Apr. 28, 1970

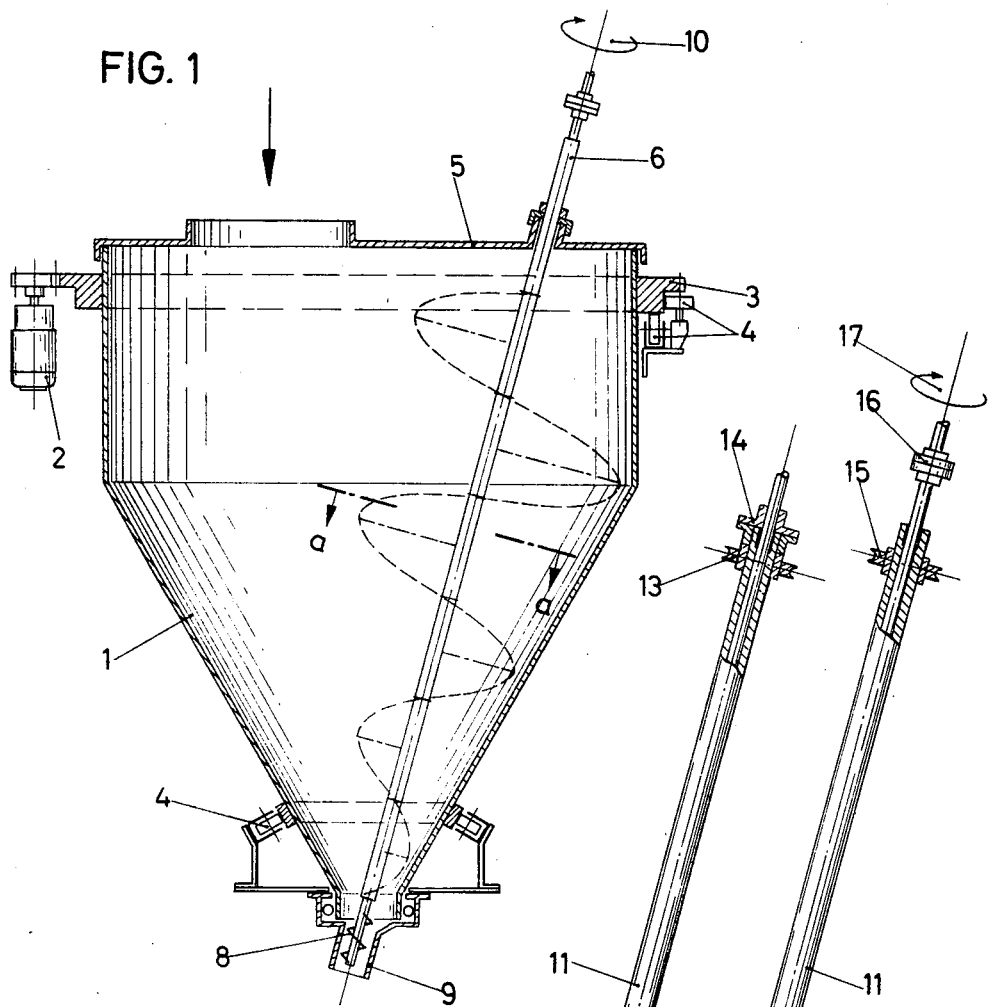

3,508,687
BIN WITH DOSING DEVICE FOR DIFFICULTLY FLOWING POWDERY SUBSTANCES
Gottfried Burgstaller, Burgkirchen (Alz), Germany, assignor to Farbwerke Hoechst Aktiengesellschaft vormals Meister Lucius & Bruning, Frankfurt am Main, Germany, a corporation of Germany
Filed July 2, 1968, Ser. No. 742,029
Claims priority, application Germany, July 13, 1967,
F 52,940
Int. Cl. B67d 5/64
U.S. Cl. 222—162                                     4 Claims

ABSTRACT OF THE DISCLOSURE

A dosing bin for poorly flowing powdery material is described which bin is conical in its lower part, is rotatable around its vertical axis, has means for loosening or aerating the contents in its interior, and is provided with means for withdrawing material from the bin in dosed quantities. As means for aerating the contents a screw-type conveyor is used the conveying direction of which is upward and the rotating axis of which is inclined so as to include acute angles with the vertical rotating axis of the bin as well as with the wall of the lower conical part of the bin. As dosing means a dosing screw is used the conveying direction of which is opposed to that of the aerating device, and the rotating axis of which is the direct continuation of the rotating axis of the aerating device.

---

The present invention relates to a bin with built-in dosing device which ensures a uniform and correct dosage of difficultly flowing powdery substances.

To dose solid, powdery substances from supply vessels and the like numerous devices have been proposed, for example dosing screws, locks with dosing cells, plate feeders, vibrating screws, vibrating channels or vibrating bins. In these devices forces, especially shearing forces, are exerted on the material and this may result in undesirable changes of the consistency of sensitive material, i.e. in lump formation. Such changes are highly detrimental for the further handling of materials, such as salts, powdered foods, and especially for the processing of pulverulent polymers to shaped articles.

To overcome these difficulties dosing bins have been provided with devices for loosening the contents. The material pre-loosened in the bin is then fed to a dosing device of the above-described type. One known dosing bin which has especially been designed for pasty material but may also be used for powders consists of a rotatable container, cylindrical in its upper part and conical in its lower part, and a conveying screw installed within the conical part of the container. The axis of the screw runs parallel to the wall of the conical part, the conveying direction of the screw being upward. The contents of the bin are fed through a bottom outlet to a dosing device which is installed outside the bin and independent thereof.

Similar arrangements have been used for making powder blends, the ready blend being again fed to dosing devices outside and independent of the bin.

In either case substances with poor flowing properties tend to form bridges and the transition between the loosening device and the dosing device becomes clogged.

To prevent the bottom outlet of a dosing bin from becoming clogged stirrers have been provided to keep the material in a loose form in the transition zone between the loosening device in the bin and the dosing device. Such stirrers, however, exert more or less shearing forces on the material which is handled. With powders of poor flowing characteristics stirring often leads to a densification, lump formation and undesired changes in the consistency rendering difficult a uniform dosage.

The difficulties encountered with the dosing bins of conventional design are overcome by the dosing bin of the present invention.

The invention provides a dosing bin for handling powders with poor flowing characteristics, said dosing bin having a cylindrical upper part and a conical lower part with a bottom outlet and being rotatable around its vertical axis, in which dosing bin a conveyor screw is arranged, the conveying direction of which is upward and the axis of which is inclined so as to include acute angles with the vertical axis as well as with the wall of the conical lower part of the bin, a dosing device being arranged in the bottom outlet, said dosing device being a dosing screw whose rotating axis is coaxial with the axis of the conveyor screw in the bin.

The conveyor screw may be of any conventional design, paddle screws having shown to be most preferable from a practical point of view. The conveyor screw may, without deviating from the scope of the invention, be replaced by other stirring, conveying, mixing or blending devices as long as a device is used which will move the contents of the bin in upward direction.

The combination of a conveyor screw with a dosing screw arranged according to the invention surprisingly enables a correct and uniform dosing of the contents of the bin without perceivable changes in the pulverulent consistency.

The conveyor screw and the dosing screw may be arranged on a common shaft, their turning direction being the same and their conveying directions being opposed to each other.

In a special embodiment of the invention the conveyor screw is provided with a hollow shaft through which the shaft of the dosing screw extends coaxially, a detachable coupling being provided which permits to shut off the dosing screw while rotating the conveyor screw. This arrangement is of particular use when the contents of the bin are to be mixed or blended before dosing is started or when intermittent dosing is desired.

In another embodiment of the invention the hollow shaft of the conveyor screw and the shaft of the dosing screw are provided with a separate drive each, the speed of each drive being variable or constant as desired.

With all embodiments aforedescribed the dosing screw can be interchangeable, thus permitting the dosing rate to be varied within wide limits and adjusted to all requirements.

The invention will now be more fully described by way of example with reference to the accompanying drawing of which:

FIGURE 1 shows a sectional view of a dosing bin with the conveyor screw and the dosing screw, FIGURE 1a shows a sectional view of the conveyor screw, FIGURE 2 shows the assembly of the conveyor screw and the dosing screw, with the conveyor screw having a hollow shaft and the shaft of the dosing screw extending coaxially through that hollow shaft and being coupled therewith by a detachable clutch, and FIGURE 3 shows, as in FIGURE 2, an arrangement in which the conveyor screw as well as the dosing screw are provided with separate drives.

Referring now to the drawing:

In FIGURE 1 a cylindrical bin with conical lower part 1 is rotatable by a variable drive 2 via a gear wheel or a chain wheel 3 or, in the case of a smaller unit, by a friction wheel or belt. In general, a circumferential speed of 1 to 5 meters per second is sufficient. The bin is supported on supporting or guide rollers 4. It is covered by a stationary cover provided with filling tube 5 which, in general, need not be sealed with respect to the rotatable part.

In the bin a conveyor screw 6 is arranged in such a manner that its axis includes acute angles with the axis of the bin as well as with the wall of the conical part thereof. It has proved advantageous to use a screw with paddles 7, as shown in a sectional view along line a—a, which are so arranged that their distance to the wall is a few millimeters only. Inclination, breadth and distance of the paddles to one another are chosen in dependence on the type of material to be treated and the purpose of the installation. It is essential that the paddles convey the material in upward direction and that they are arranged on the screw down to the dosing screw 8. In contrast with the paddle screw, the dosing screw conveys the material downwards. It is advantageous when the dosing screw is connected with the conveyor screw 6 so as to be easily exchanged that within a short period of time different screws may be fitted in and the dosing rate may be varied. The conveyed amount of material can be adjusted in known manner by the inclination of the screw, by using a screw with one or several pitches or by the diameter of the interchangeable sleeve 9. The conveyed amount of material is directly proportional to the number of revolutions of the shaft and with a constant number of revolutions of the bin it can be varied in a ratio of about 1 to 10. According to the size of the bin, most favorable number of revolutions is in the range of from 10 to 200 per minute. The ratio of the number of revolutions of the bin to the number of revolutions of the screw is chosen so that the material is not densified.

The conveyor screw and the dosing screw are preferably made of a plastics material with good sliding properties or a metal coated with an anti-adhesive agent, for example polytetrafluoroethylene. The same materials are used for the interchangeable sleeve 9.

The conveyor screw 6 with the dosing screw 8 is driven by a drive 10. The bin and the shaft of the screw rotate in the same direction.

In FIGURE 2 the paddle screw 11 has a hollow shaft in which rotates a second shaft 12 with dosing screw 8. The two shafts 11 and 12 are connected with one another by a magnetic clutch 14. The shaft drive 13 is illustrated by a belt pulley. When the magnetic clutch 14 is released the inner shaft 12 with the dosing device do no longer turn, no material is discharged with the paddle screw 11 is then used to blend the material in the bin.

FIGURE 3 shows a further embodiment of the device of the invention. In this case, too, the paddle screw 11 has a hollow shaft into which is fitted concentrically the shaft of the dosing screw 12 with the dosing device. 8. The paddle screw 11 is driven by drive 15 shown a belt pulley, whereas the dosing screw is set in motion by a separate drive 17 with which it is connected by coupling 16. Using a device of this latter type the number of revolutions of the dosing screw and consequently the discharge from the bin can be varied in accordance with the varying requirements. When coupling 16 is released the material in the bin may be blended without any discharge taking place.

The arrangement according to the invention for dosing difficultly flowing powdery substances has proved very advantageous in all tested cases, for example with finely divided polytetrafluoroethylene to be dosed into a connected extrusion device.

What is claimed is:

1. A dosing bin for handling powders with poor flowing characteristics, said dosing bin having a cylindrical upper part and a conical lower part with a bottom outlet and being rotatable around its vertical axis, in which dosing bin a conveyor screw is arranged, the conveying direction of which is upward and the axis of which is inclined so as to include acute angles with the vertical axis as well as with the wall of the conical part of the bin, a dosing device being arranged in the bottom outlet, said dosing device being a dosing screw whose rotating axis is coaxial with the axis of the conveyor screw in the bin.

2. The dosing bin of claim 1, in which the dosing screw can be exchanged.

3. The dosing bin of claim 1, in which the conveyor screw has a hollow shaft in which the driving shaft of the dosing screw rotates in concentric manner, the conveyor screw and the driving shaft of the dosing screw being connected by a detachable clutch.

4. The dosing bin of claim 1, in which the conveyor screw has a hollow shaft in which rotates concentrically the driving shaft of the dosing screw, the conveyor screw and the dosing screw being provided with separate adjustable driving means.

References Cited

UNITED STATES PATENTS

| 2,742,196 | 4/1956 | Grether | 222—239 X |
| 2,781,952 | 2/1957 | Mahoney | 222—168 |
| 3,148,802 | 9/1964 | Webb | 222—241 X |
| 3,177,527 | 4/1965 | Nelson | 222—241 X |

FOREIGN PATENTS

| 659,362 | 2/1929 | France. |
| 897,925 | 6/1944 | France. |
| 155,389 | 12/1920 | Great Britain. |

SAMUEL F. COLEMAN, Primary Examiner

U.S. Cl. X.R.

222—241